April 9, 1957  C. B. NOELTING ET AL  2,787,804
CASTER BEARING SEAL AND DAMPER
Filed March 23, 1955
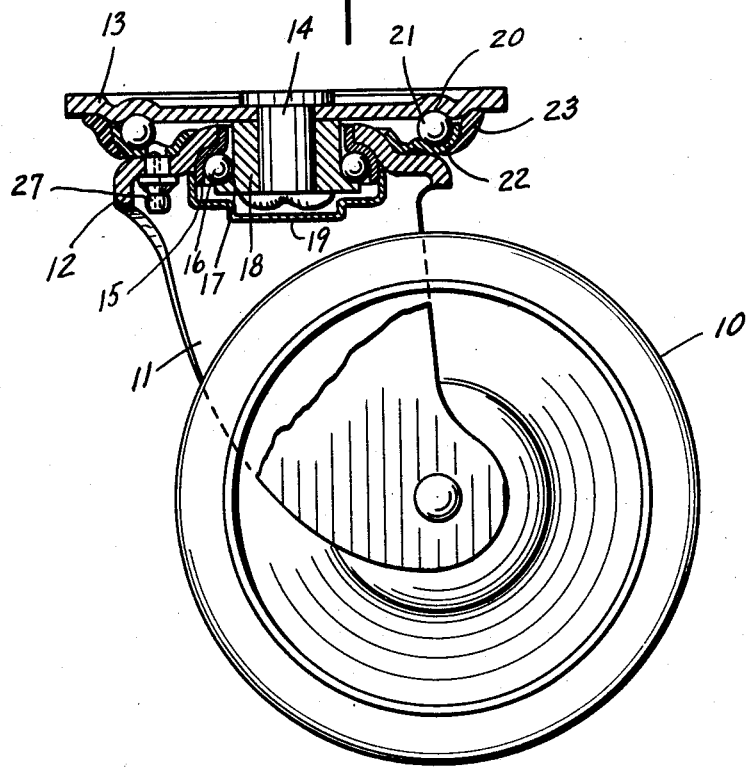
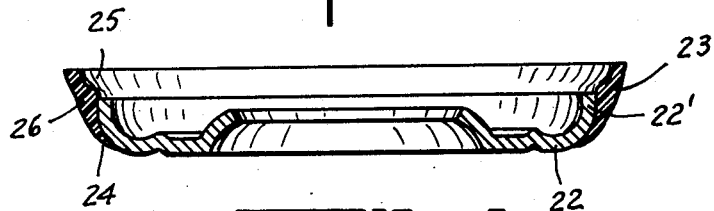
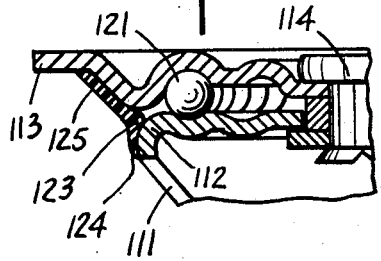
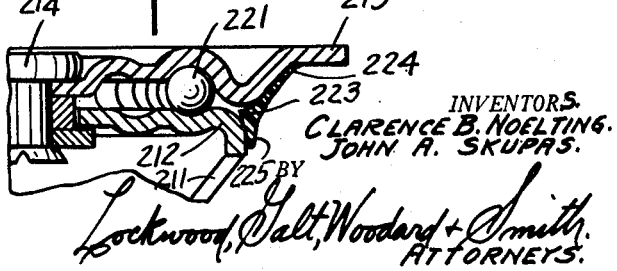
INVENTORS.
CLARENCE B. NOELTING.
JOHN A. SKUPAS.
BY
Lockwood, Galt, Woodard + Smith
ATTORNEYS.

United States Patent Office 2,787,804
Patented Apr. 9, 1957

2,787,804

CASTER BEARING SEAL AND DAMPER

Clarence B. Noelting and John A. Skupas, Evansville, Ind., assignors to Faultless Caster Corporation, Evansville, Ind., a corporation Application March 23, 1955, Serial No. 496,179

2 Claims. (Cl. 16—21)

This invention relates to a caster bearing seal and damper to provide a grease seal for the roller bearing structure between the swivel plate and the top plate of the caster horns.

In such caster structures, and particularly heavy duty casters, it is desirable that grease be retained within the swivel bearing structures and dirt and foreign matter prevented from entering it, and wherein the seal further acts as a damper for resisting shimmy.

It is recognized that grease and protective seals of various forms and structures have heretofore been employed, but not applicable to a caster bearing of this character, or embodying the simplicity and effectiveness of a combined seal and dampers, as more particularly hereinafter pointed out.

It is, therefore, the object of this invention to provide the ball retainer or plate of the caster with a permanently affixed flexible seal comprising an integral part thereof, and arranged to have sealing contact with the swivel plate or horn to entirely enclose the ball bearings and races, and provide such frictional engagement with the swivel plate or horn as to resist shimmy therebetween.

The full nature of the invention will be understood from the accompanying drawings and the following description and claims:

Fig. 1 is a side elevation of a caster with parts broken away showing the bearing structure in central vertical section.

Fig. 2 is a central vertical section through the ball retainer with the bearing seal and damper secured thereto as an integral unit.

Fig. 3 is similar to Fig. 2 showing a modified form of the invention.

Fig. 4 is similar to Fig. 3, showing a further modified form thereof.

In the drawings there is shown, by way of illustration a caster wheel 10 rotatably mounted in the spaced horn 11 in the usual manner, the upper end of the horn comprising the usual top plate 12. Carried by the top plate there is a swivel plate 13 rotatably secured to the top plate of the horn by a king pin 14.

Intermediate the top plate 12 and swivel plate 13 there is provided a plurality of bearings. For this purpose the top plate is provided with a bottom race 15 carrying the ball bearings 16 seated in the companion race 17 formed about the lower end of a stud 18, all pivotally locked to the swivel plate by the king pin 14. To protect the lower bearing there is provided a dust cap 19 in the form of a drawn cylindrical steel cup press fitted about the lower portion of the bottom race 15.

The swivel plate is formed with an annular groove forming a top race 20 in which the ball bearings 21 ride, seating on the ball retainer portion 22 of the top plate, said ball retainer portion being secured to and forming an upper portion of the top plate 12, being secured in bearing position by the king pin.

As shown in Fig. 2, the ball retainer 22 is cup shaped having an upwardly extending curved ball retaining flange 22'. Secured about the ball retaining flange 22' there is provided a seal of flexible material, such as rubber, Neoprene or the like. The seal 23 is formed with an inwardly curved tapered or feathered edge 24 fitting snugly about, and vulcanized to the flange 22' of the ball retainer, whereby the lower edge of the seal merges into the outer surface thereof. The seal extends upwardly and outwardly terminating in a concave annular lip portion 25 having an intermediate thickened body portion 26 in the plane of the upper edge of the ball retainer, such as to provide leverage therefor.

When the ball retainer with its seal is assembled between the top plate 12 and the swivel plate 13, the edge of the lip portion 25 engages the under surface of the swivel plate just beyond the top race 20 and is flared outwardly due to the pressure contact therewith. Thus, the lip portion 25 provides a lubricant seal with the swivel plate while permitting relative rotation therebetween with a degree of frictional resistance, such as to provide a damping of the shimmy. Access may be had to the upper bearing within the seal through the usual grease cup as indicated at 27.

By reason of the particular structure of the seal, its feathered edge at 24 merges into the outer curvature of the ball retainer to which the seal is secured as by vulcanizing to form an integral part thereof. The intermediate bottom portion 26 reinforces and stiffens the outwardly flared lip portion 25 to provide such leverage as to at all times urge the lip portion into sealing and clamping engagement with the swivel plate. With the seal permanently secured about the ball retainer it forms an integral part of that unit for ease in assembly and maintenance.

In the modified form shown in Fig. 3, the top plate 112 of the horn 111 is formed to include the ball retainer portion in which the bearing structure 121 rides. The swivel plate 113 is similarly formed to provide the opposed race for the bearing structure, the two plates being pivotally carried by the king pin 144. In this modification the seal 123 has its feathered edge 124 fitted snugly about and vulcanized to the periphery of the top plate 112 to extend upwardly and outwardly, terminating in an annular lip portion 125 having frictional and sealing engagement with said swivel plate.

In the form shown in Fig. 4, the arrangement is just the reverse, wherein the ball bearing structure 221 is confined in opposed races formed in the top plate 212 of the horn 211 and embraced by the conforming ball retainer portion of the swivel plate 213 pivotally connected with the top plate 212 by the king pin 214. The seal 223 has its feathered edge 224 fitting snugly about and vulcanized to a peripheral portion of the swivel plate 213 to extend downwardly into a lip portion 225 having sealing and frictional engagement with the periphery of the top plate 212.

The invention claimed is:

1. In a caster having a wheel supporting horn including a top plate having a ball retaining portion, a swivel plate pivotally connected thereto, a ball bearing structure interposed between said plates, and a bearing grease retaining seal and damper of flexible and compressible material fixedly adhered to the periphery of one of said plates extending therefrom into flexing and frictional engagement with the other said plate, said seal being tapered to a feathered edge merging with the peripheral surface of the plate to which it is secured as by vulcanizing and terminating in a concave annular flared lip portion extending into flexing and frictional engagement with the other said plate, the intermediate body portion of said seal being thickened about the outermost edge of the said first-mentioned plate to provide leverage for said lip portion.

2. In a caster having a wheel supporting horn including a top plate, a swivel plate pivotally connected thereto, one of said plates having a ball retaining portion, a ball bearing structure interposed between said plates, and a sealing and damping ring of flexible and compressible material fixedly adhered to the periphery of one of said plates, said ring being tapered to a feathered edge merging with the peripheral surface of the said one of said plates and terminating outwardly thereof with an annular lip portion extending into flexing and frictional engagement with the other of said plates, the intermediate body portion of said ring being thickened about the outermost edge of the said one of said plates to provide leverage for said lip portion.

References Cited in the file of this patent

UNITED STATES PATENTS

| | | |
|---|---|---|
| 1,822,998 | Noelting | Sept. 15, 1931 |
| 1,884,142 | Noelting | Oct. 25, 1932 |
| 1,885,990 | Chesnutt | Nov. 1, 1932 |
| 2,617,668 | Stewart | Nov. 11, 1952 |
| 2,621,091 | Hickling | Dec. 9, 1952 |